UNITED STATES PATENT OFFICE.

FRANK J. TONE, OF NIAGARA FALLS, NEW YORK, ASSIGNOR TO THE CARBORUNDUM COMPANY, OF NIAGARA FALLS, NEW YORK, A CORPORATION OF PENNSYLVANIA.

METHOD FOR THE PRODUCTION OF DENSE COMPACTED SILICON CARBID.

992,698.   Specification of Letters Patent.   Patented May 16, 1911.

No Drawing.   Application filed July 28, 1910. Serial No. 574,357.

*To all whom it may concern:*

Be it known that I, FRANK J. TONE, of Niagara Falls, in the county of Niagara and State of New York, have invented a new and useful Method for the Production of Dense Compacted Silicon Carbid, of which the following is a full, clear, and exact description.

This invention relates to the manufacture of silicon carbid and more especially refers to the making of silicon carbid in a dense compacted form which has many valuable properties for refractory and electrical purposes and other uses in the arts.

In my pending application Serial No. 285,462, filed November 1, 1905, I have described and claimed a method in which shaped pieces of carbon are heated in proximity to a silicon-containing substance to a temperature sufficient to cause the silicon to combine with the carbon *in situ*, thus producing similarly shaped pieces of dense silicon carbid. I have discovered that if the carbon in the piece to be treated is replaced by a mixture of silicon carbid and carbon, the penetration of the conversion into silicon carbid is increased, and I am furthermore able to obtain different values in porosity and resistance which make the product of wider utility.

To carry out this invention, I take a mixture of silicon carbid and carbonaceous material, both of which materials are preferably ground to a fine state of division, and this mixture is then molded or otherwise formed into any desired shape, preferably by mixing with some binding material, such as tar, glue or silicate of soda. The article is then preferably baked at a temperature sufficient to remove moisture and other volatile materials. The article is then placed in an electric furnace of the type ordinarily used in the production of carborundum and is embedded in a mixture of carbon and silica, or silicon carbid and silica. The furnace is brought up to the temperature of the formation of carborundum, at which temperature vapors of silica and silicon are formed and constitute part of the furnace atmosphere. These vapors of silica and silicon penetrate into the molded article to a considerable distance, this distance being controlled by the original porosity of the molded article and the temperature and concentration of the vapors of silica and silicon. When these vapors come in contact with the carbonaceous material contained in the molded articles, they react with the carbon and change it into silicon carbid. The binder used for forming the molded article is decomposed or volatilized and the resultant product consists of silicon carbid bonded with silicon carbid in a dense compacted form.

I may vary the nature of my product by changing the temperature and the gaseous atmosphere to which the molded articles are subjected, and in this way obtain products varying in the depth to which the above mentioned process has taken place, and in this way obtain a product in which the inner part consists of silicon carbid and carbonaceous matter, and the outer part consists of silicon carbid alone. I may also vary the nature of the silicon carbid and carbonaceous material used to form the product. I may take either crystalline or amorphous silicon carbid and coke, charcoal and other forms of carbonaceous material. I may also vary the size of the particles of silicon carbid and carbonaceous material used in forming the molded articles and in this way produce articles of very different physical properties. By changing all these conditions, I am able to vary to a very large extent the physical condition of toughness, porosity, electrical and specific resistance, etc. Articles formed in this manner are very valuable for refractory purposes since they are composed of silicon carbid alone.

I claim:

1. The method of making shaped pieces of dense silicon carbid, which consists in forming similarly shaped pieces from a mixture of silicon carbid and carbon and heating said pieces in proximity to a silicon-containing substance to a temperature sufficient to cause the silicon to combine with the carbon *in situ*, and less than that required to destroy the resulting compound, substantially as described.

2. The method of making shaped pieces of silicon carbid, which consists in forming similarly shaped pieces from a mixture of silicon carbid and carbon, heating said pieces in proximity to the vapors of a silicon-containing substance, causing the combination of the silicon with the carbon *in situ*, the temperature being sufficient to cause the silicon and carbon to combine but insufficient to destroy the resulting compound, substantially as described.

3. The method of making dense silicon carbid, which consists in forming a shape from a mixture of silicon carbid and carbon, and heating said article in an atmosphere containing silica and silicon vapors, substantially as described.

4. The method of making dense silicon carbid, which consists in forming a body from a mixture of silicon carbid and carbon, with a suitable binder, baking the body to remove moisture and other volatile substances, and embedding the article in a mixture containing silicon carbid and silica, and heating it to the temperature of formation of carborundum, substantially as described.

In testimony whereof, I have hereunto set my hand.

FRANK J. TONE.

Witnesses:
ORLANDO B. WITMER,
W. A. DWYER.